United States Patent [19]
Gero et al.

[11] Patent Number: 5,791,495
[45] Date of Patent: Aug. 11, 1998

[54] PAPER PULP SCREEN CYLINDER

[75] Inventors: William A. Gero, Pittsfield; Stephen G. W. Munro, Lenox; Philip H. Goldenberg, Pittsfield, all of Mass.

[73] Assignee: Beloit Technologies, Inc., Beloit, Wis.

[21] Appl. No.: 615,554

[22] Filed: Mar. 11, 1996

[51] Int. Cl.⁶ .............................. B07B 1/49; B01D 35/00
[52] U.S. Cl. .................... 209/395; 209/405; 209/406; 209/411; 210/485; 210/498
[58] Field of Search ......................... 209/393, 395, 209/405, 406, 407, 409, 410, 411; 210/413, 485, 497.01, 498; 29/163.6, 163.7

[56] References Cited

U.S. PATENT DOCUMENTS

| | | | |
|---|---|---|---|
| 1,937,274 | 11/1933 | Hoyle et al. | 92/38 |
| 2,311,813 | 2/1943 | Beck et al. | 92/32 |
| 4,276,159 | 6/1981 | Lehman | 209/273 |
| 4,362,622 | 12/1982 | Urquhart | 210/486 |
| 4,410,424 | 10/1983 | Chupka et al. | 209/273 |
| 4,529,520 | 7/1985 | Lampenius | 210/498 |
| 4,697,060 | 9/1987 | Izuwa et al. | 219/121 ED |
| 4,764,277 | 8/1988 | Yoshida | 210/498 |
| 4,812,229 | 3/1989 | Tra | 209/397 |
| 4,828,689 | 5/1989 | Lamort | 209/393 |
| 4,846,971 | 7/1989 | Lamort | 210/232 |
| 4,855,038 | 8/1989 | LeBlanc | 209/273 |
| 4,880,540 | 11/1989 | Frejborg | 210/413 |
| 4,898,665 | 2/1990 | Lamort | 209/273 |
| 4,946,602 | 8/1990 | Ekberg et al. | 210/785 |
| 4,954,249 | 9/1990 | Gero et al. | 209/273 |
| 5,041,212 | 8/1991 | Gero et al. | 209/273 |
| 5,041,214 | 8/1991 | Gero et al. | 209/273 |
| 5,064,536 | 11/1991 | Bratten | 210/402 |
| 5,094,360 | 3/1992 | Lange | 209/411 X |
| 5,139,154 | 8/1992 | Gero et al. | 209/273 |
| 5,285,560 | 2/1994 | Gero et al. | 29/402.08 |
| 5,387,340 | 2/1995 | Ackerman | 210/497.01 |
| 5,411,084 | 5/1995 | Padden | 166/230 |

FOREIGN PATENT DOCUMENTS

| | | |
|---|---|---|
| 972322 | 8/1975 | Canada. |
| 0 357 382 A2 | 3/1990 | European Pat. Off.. |
| 0 567 726 A1 | 11/1993 | European Pat. Off.. |
| 0 686 417 A1 | 12/1995 | European Pat. Off.. |
| 1157200 | 11/1963 | Germany. |
| 39 42 484 A1 | 6/1991 | Germany. |
| 519680 | 4/1940 | United Kingdom. |

OTHER PUBLICATIONS

"J&L RSC Screen Cylinder", J&L Fiber Services, Waukesha, Wisconsin.

"Beloit Fiber Systems BelWave™ Screen Basket", Beloit Corporation, Beloit Fiber Systems Division, Dalton, Massachusetts.

"Beloit Fiber Systems M-R Screen™", Beloit Corporation, Beloit Fiber Systems Division, Dalton, Massachusetts.

"Beloit Fiber Systems M Series Low Pulse Screen", Beloit Corporation, Beloit Fiber Systems Division, Dalton, Massachusetts.

*Primary Examiner*—Tuan N. Nguyen
*Attorney, Agent, or Firm*—Lathrop & Clark

[57] ABSTRACT

A plurality of like wedge bars are formed with a groove between two lands. The wedge bars are assembled into a cylindrical screen, with the grooves defining screening slots of a uniform width. The wedge bars may be electron beam welded or furnace brazed to support rings. Alternatively, the wedge bars may be held in place by slots in support rings and circumferential clamping applied by jack wedge assemblies. Multiple cylindrical segments may be connected together into a single screen cylinder by an ear and slot arrangement. The screen cylinder so formed may have slots of 0.004 inches or less in width, and may be formed of a wide range of wear and corrosion resistant materials.

16 Claims, 4 Drawing Sheets

PAPER PULP SCREEN CYLINDER

FIELD OF THE INVENTION

The present invention relates to screens for processing paper pulp in general and to such screens constructed of parallel wires or bars in particular.

BACKGROUND OF THE INVENTION

In the processing of wood fibers into suitable pulp stock for manufacturing paper, it is necessary to remove undesirable materials from the starting fiber stock. Processing the fibers through a screen is an important technique for separating sand, stickies, and oversized particles from the fibers of desired size and quality. It is also possible to use screens for removing short fibers from virgin fiber or from reprocessed fibers such as those recovered from recycled paper. A common screening apparatus for this purpose uses a fixed cylindrical screen through which fiber stock is pumped. Finer fibers pass through the screen and are separated from the larger fibers which are drawn off from a point within the cylindrical screen.

With any screen, there is a tendency for fibers to form a mat across the screen openings and thus block further flow of fiber through the screen. To overcome this plugging of the screen, rotatable rotors or beaters are employed within the cylindrical screen which alternatively push and pull fibers through the screen openings. During the push or pressure cycle fibers flow through the screen. During the negative pressure cycle fibers are pulled away from the screen. This pulling unclogs the surface of the screen so the next positive pulse can push fibers through the screen openings. In some applications the pulses can be particularly aggressive and subject the screen to high stresses. For example U.S. Pat. No. 4,855,038 to LeBlanc et al. shows the use of a rotor with a plurality of knobs or bumps which pass over a cylinder screen causing a papermaking stock of wood fibers to flow through the screen.

Screening devices are also used to manufacture a higher grade product from lower grade secondary fiber. Ideally, a screen with ultrafine and very consistent slots which can withstand the forces within the screening apparatus is desired. Consistent slots smaller than about 0.006 inches in width are presently difficult to obtain using today's manufacturing techniques. Because of the higher degree of contaminants found in low grade secondary fiber it is desirable to form the screen from materials which are resistant to chemicals and mechanical abrasion. It is also desirable to have greater production or throughput from a given size machine without increasing the horsepower. Greater productivity with the same or lesser costs is the desired end result.

Slotted screen cylinders may be manufactured by the saw cutting method. In this approach, a plate is positioned on a cutting table where an inner profile is produced by a series of saw cuts. The plate is then turned over and positioned and the desired relief is cut. The plate is again turned over, positioned and the slots cut. The plate is then manually deburred and then rolled to a given diameter. Semi-machined support and mounting rings are attached using conventional welding techniques including TIG, MIG or resistance welding. The screen cylinder support and mounting rings are then finish machined. A final chemical or electro polish is then performed. A chrome or other like hard material may be applied to enhance wear resistance.

The size of the slot produced by this method is limited to a size of not much smaller than 0.006 inches in width. Even slots of this size are accomplished by cutting a larger slot and coating it down with some compatible material such as chrome or nickel. Because of this manufacturing method, a relatively soft material such as stainless steel 316S (sulfur added) is used to allow the cutting tool to produce the desired slot. This relatively soft material can wear out very quickly if exposed to the contaminants found in secondary fiber. Another problem with this method is that when the plate is being turned from one side to another it is possible to shift the plate out of position such that the desired slot to profile location is not achieved which drastically reduces the hydraulic capacity of the screening apparatus. Yet another problem with this manufacturing method is that the amount of open area is limited due to the cutter diameter and holder used to produce the desired slot. Due to the labor involved in manufacturing the screen cylinder the cost per ton of material processed ratio may be higher than desirable.

Another conventional screen cylinder manufacturing method uses a laser or waterjet to form the slots. After using a saw-like device to cut rough slot openings, and deburring the openings with a wire brush, the screen plate is rolled to its desired diameter and the semi machined support and mounting rings are attached using a conventional welding technique such as TIG, MIG or resistance welding. The screen cylinder with rough openings is positioned on a rotary table and the desired slot is cut using a water jet or laser. The slots are then manually deburred and the cylinder support and mounting rings are then finish machined. This method is capable of producing a screen cylinder that has more open area then attainable by the saw-cutting method and is not limited to the relatively soft material required by the saw-cutting method. However, it is still does not produce slot sizes having the level of uniformity desired.

With the water jet method, an aggregate is added to the solution to aid in the cutting process. The aggregate wears the tip of the cutter which results in changes in the slot size being formed. The laser cutting method, on the other hand, can produce slots which are excessively rough. Fibers have a tendency to catch on these rough edges producing strings. Lack of homogeneity in the material being cut by the laser beam will result in inconsistent slot size.

Another conventional method of slotted screen cylinder manufacture uses multiple wedge wires or bars. A round wire may be extruded or formed into a desired shape. These wedge wires or bars are then placed on linear supports with a shim of the desired slot size placed between each wedge bar in the flat state. The bars are attached to their linear supports by conventional welding. The shims are then removed and the welded section of wedge wire, together with the linear support is rolled to a desired diameter so the linear supports form rings and the wedge bars define a cylinder which is welded at its seam. The cylinder support rings are then machined to accept the semi machined screen mounting rings which are again welded by conventional welding techniques followed by finish machining of the mounting rings. Screen cylinders produced by this method may be more open than the cylinders produced by saw cutting, water jet cutting or laser cutting. However the wedge bars can become distorted by the welding process and stressed from rolling after welding. Welding and rolling stresses can result in slot sizes which vary by as much as plus or minus 0.004 inches from the desired dimension.

The stresses induced by rolling and welding the wedge bars may result in the screen cylinder becoming weakened during operation due to the repetitive stress induced by the pulse producing rotor. If a catastrophic failure occurs which destroys the entire screen cylinder, extensive damage to downstream equipment can result. The forces generated within the screening apparatus, including axial forces from the processed material moving through the screen, and radial forces from the pulsation-generating rotor, can result in changes to the slot sizes with a commensurate impact on the quality of the screened pulp fiber. Wedge bar screen cylinders can be manufactured at a lower cost than screens produced by saw cutting, waterjet cutting or laser cutting, but the problems of inconsistent slot size and lack of strength remain.

Yet another method to manufacture a slotted screen cylinder is to use relatively thin material and form it in a forming machine to its desired shape. Then within the same forming machine a slot of the desired size is lanced. This material is then clamped between machined support rings. Screen cylinders so produced are of low cost and perform well. In addition, they permit the replacement of selected portions of the entire screen without the need to replace the entire screen. Nonetheless, due to limitations of the forming process, and the required thickness of material in order to withstand the generated forces, the open area is limited as are the obtainable minimum slot sizes. Material selection is also limited.

What is needed is a sturdy screen for use in processing paper fibers which has more uniform slot size and can be constructed with slots of smaller width.

SUMMARY OF THE INVENTION

The pulp screen cylinder of this invention can be made from virtually any weldable material to enhance wear or corrosion resistance and which can have, but is not limited to, consistent ultra fine slots of less than 0.004 inches in width with a greater open area than previously obtainable for a higher ton per day of material processed in the same machine without the need for increased horsepower. The screen cylinder may be produced at a cost less than or equal to screen cylinders of conventional design.

Wedge bars are extruded to a desired shape and a slot of the desired screen opening width is cut into each wedge bar by milling or grinding. Lands are placed in the ends of each piece of wedge bar as well as at strategic points along its length to add support and locate supporting rings. These lands allow the wedge bars to be stacked together without changing or varying the desired slot size. In a preferred embodiment the identical wedge bars are assembled into a cylindrical wall and held together by top and bottom support rings. The wedge bars are kept engaged by jack wedge arrangements which use a wedge and screw arrangement to circumferentially expand two shims to retain the wedge bars in close engagement. The assembled wedge bars and supports are held together with other like assemblies by tie rods to form a single screen cylinder.

Alternatively, the wedge bars may be positioned into their desired diameter support rings, held tightly together and attached by either electron beam welding or furnace brazing techniques. The supporting members are preferably round rods which are rolled to their desired diameter and inserted over the screen cylinder and located over the lands and attached by either electron beam welding or furnace brazing. By using rolled round bars as supporting members and locating them over the strategically located lands the screen cylinder can withstand the forces developed inside a screening apparatus. By using rolled round bars as a supporting member the open area is maximized and a ready avenue for the electron beam welding or furnace brazing media is provided. By using the electron beam welding or furnace brazing techniques to attach the various mounting and supporting members to the wedge bars there is virtually no distortion. The resulting desired slot size does not vary from what was originally intended. The wedge bars may thus be formed of virtually any weldable material to enhance wear or corrosion resistance. The several cylinder segments may be connected by interlocking ear and slot arrangements.

It is a feature of the present invention to provide a screen cylinder with greater open area.

It is another feature of the present invention to provide a screen cylinder with ultrafine slot widths.

It is an additional feature of the present invention to provide a screen cylinder with consistent slot widths.

It is a further feature of the present invention to provide a screen cylinder in which selected damaged portions may be readily replaced.

It is also a feature of the present invention to provide a screen cylinder for a pulp screening apparatus which has increased throughput without requiring increased horsepower.

It is yet another feature of the present invention to provide a multipart screen cylinder which is rapidly assembled.

It is a further feature of the present invention to provide a screen cylinder which may be formed of corrosion and wear resistant materials.

Further objects, features and advantages of the invention will be apparent from the following detailed description when taken in conjunction with the accompanying drawings.

DESCRIPTION OF THE PREFERRED EMBODIMENTS

Figure 1:
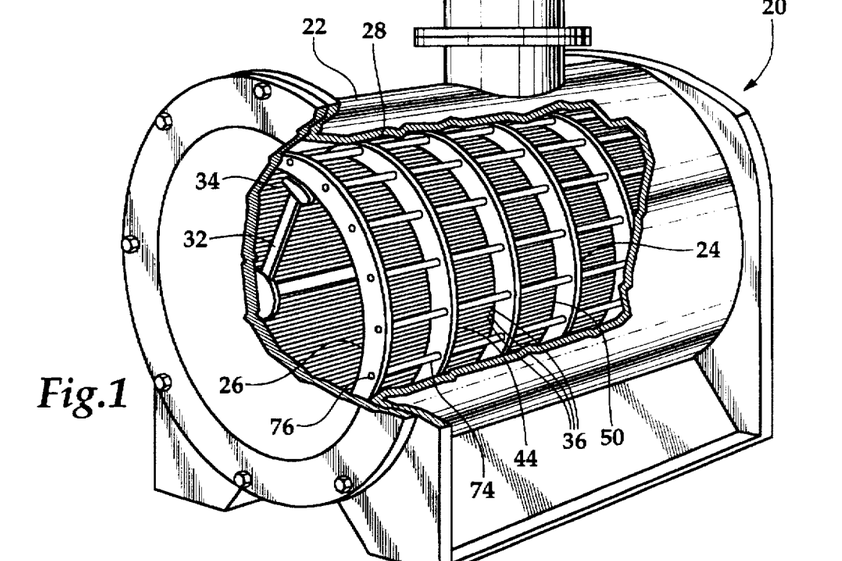
FIG. 1 is an isometric view, partially broken away, of a pulp pressure screen having a pulp screen cylinder of this invention.

Referring more particularly to FIGS. 1–17, a pulp pressure screening apparatus 20 is shown in FIG. 1. The screening apparatus 20 is used for separating out various fractions from a flow of pulp based on particle size. The screening apparatus 20 has a housing 22 into which pulp to be treated is introduced. A screen cylinder 24 is fixed within the housing 22. An internal chamber 26 is defined within the cylinder, and an external chamber 28 is defined between the housing and the cylinder 24. A flow of pulp is introduced under pressure into the internal chamber 26. Pulp fibers which are smaller than screen openings 30 in the screen cylinder pass through into the external chamber 28. Larger fibers, stickies, sand and other trash pass out of the screen cylinder through a separate outlet, not shown.

A rotor 32 is mounted within the internal chamber. The rotor 32 has one or more lobes or hydrofoils 34 which are mounted in proximity to the screen cylinder 24 and which rotate to aid the passing of liquid stock with pulp through the screening openings 30 and to help inhibit plugging of the openings. Various rotor structures may be employed depending on the type of screen cylinder and the type of stock to be treated.

Figure 2:
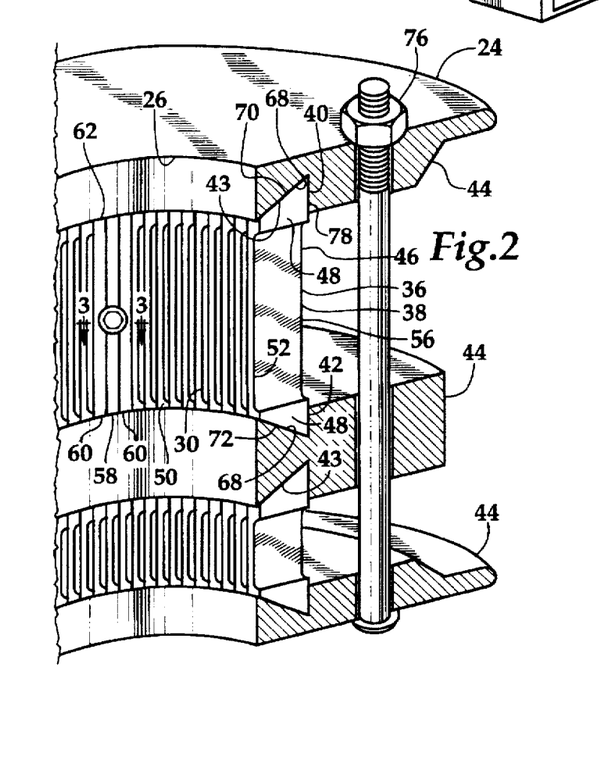
FIG. 2. is a fragmentary isometric view of the pulp screen cylinder of the apparatus of FIG. 1.
Figure 3:
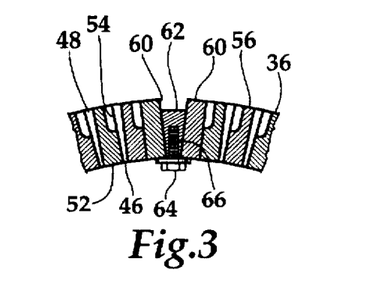
FIG. 3 is a fragmentary cross-sectional view of the pulp screen of FIG. 2 taken along section line 3—3.

The screen cylinder 24, as shown in FIGS. 2 and 3, is assembled from a large number of identical wedge wires or bars 36. Each bar 36 has an elongated body 38 with an upper tab 40 and a lower tab 42. The tabs 40, 42 are inclined radially inwardly, and are received within circumferential slots 43 formed within annular support rings 44. In a preferred embodiment, each bar is extruded in a wedge shape of a desired corrosion resistant material, such as stainless steel. A groove 46 is cut into each bar 36 by milling or grinding, to thereby leave raised lands 48 at the tabs 40, 42. Depending on the length and thickness of the bars 36, additional lands 48 may be left between tabs 40, 42 to increase the structural stiffness of the bars 36. As the blanks from which the bars 36 are formed are consistent in dimensions, it is possible to grind the grooves to very close tolerances, which makes it possible to have groove depths which are less than 0.004 inches deep with minimal variation between bars.

Figure 4:
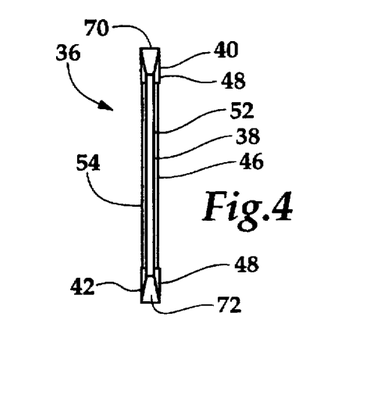
FIG. 4 is a front elevational view of a single wedge bar of the pulp screen of FIG. 2.

As shown in FIG. 4, each bar 36 tapers radially inwardly, such that when sufficient bars are placed next to one another they define a cylindrical wall 50 of the screen cylinder 24. Each wedge bar 36 has an interior face 52 which adjoins the internal chamber 26. The groove 46 relieves a portion of the interior face 52 to define a screen opening 30 with an adjacent wedge bar 36. As shown in FIG. 3, each bar has a relief slot 54 which is formed opposite the groove 46. The relief slot 54 opens outwardly to the exterior face 56 of the wedge bar 36. The relief slots 54 do not reach to the interior face 52 of the wedge bar 36 and thus do not affect the size of particle which can be admitted through the opening 30. The relief slots 54 serve to increase the effective width of the passage presented to fluid flowing through the openings 30, and thus reduce the likelihood of clogging of any particular opening.

Each wedge bar 36 acts like a keystone in a 360-degree arch, such that all the wedge bars together retain the proper cylindrical arrangement. The wedge bars are installed and held in place by an expanding means, for example a three-wedge jack assembly 58 as shown in FIG. 3. At one or more positions around the perimeter of the wall 50 a jack assembly 58 is inserted between two wedge bars 36. The jack assembly has two shims 60 which taper toward the exterior of the cylinder 24. A third shim or jack wedge 62 tapers toward the interior of the cylinder and is disposed between the two shims 60. A threaded screw 64 is threaded into a threaded blind hole 66 in the jack wedge 62. Both the shims 60 and the jack wedge extend approximately the height of the wedge bars to prevent fluid flow past the jack assembly 58. By rotation of the head of the screw 64 from the interior of the screen cylinder, the jack wedge can be made to push the two shims 60 circumferentially outwardly and thereby assure a tight assembly of the wedge bars 36 in the wall 50. When it is desired to remove all or some of the wedge bars for maintenance or replacement, the screw 64 may be adjusted to slack off the compressive forces on the wedge bars 36.

As shown in FIG. 2, the bars 36 are aligned mechanically by the inclined surfaces 68 of the circumferential slots 43 in the support rings 44. The inclined surfaces 68 engage with the inclined top surface 70 and the inclined bottom surface 72 formed on the upper tab 40 and the lower tab 42 respectively of each wedge bar 36. Tie rods 74, as shown in FIG. 1 extend through the support rings 44 and engage with nuts 76 as shown in FIG. 2. The tie rods 74 connect the support rings 44 and the wedge bars 36 into a rigid assembly which forms the cylinder screen 24. The tie rods also provide a means for securing two or more adjacent screen cylinder segments into a single screen cylinder. As the nuts 76 are tightened on the tie rods 74 to draw the support rings 44 together, the inclined surfaces 68 of the support ring slots 43 engage the inclined surfaces 70, 72 of the wedge bars 36 and the mating inclined planes drive the wedge bars 36 radially outwardly until the wedge bars 36 uniformly abut the outward peripheral lip 78 of the circumferential slots 43 in the support rings. The wedge bars 36 are then uniformly aligned as well as being fixed in position. This uniform positioning along with the circumferential rigidity of the three wedge jack assembly 58 assists in obtaining uniform size of the screen openings 30 between adjoining bar members 36.

Because the screen cylinder 24 is assembled without welding, the various elements are not subjected to possible distortions by the welding process. In addition, should portions of the cylinder 24 be damaged in operation, it is a simple matter to replace only those wedge bars 36 which are damaged.

Figure 5:
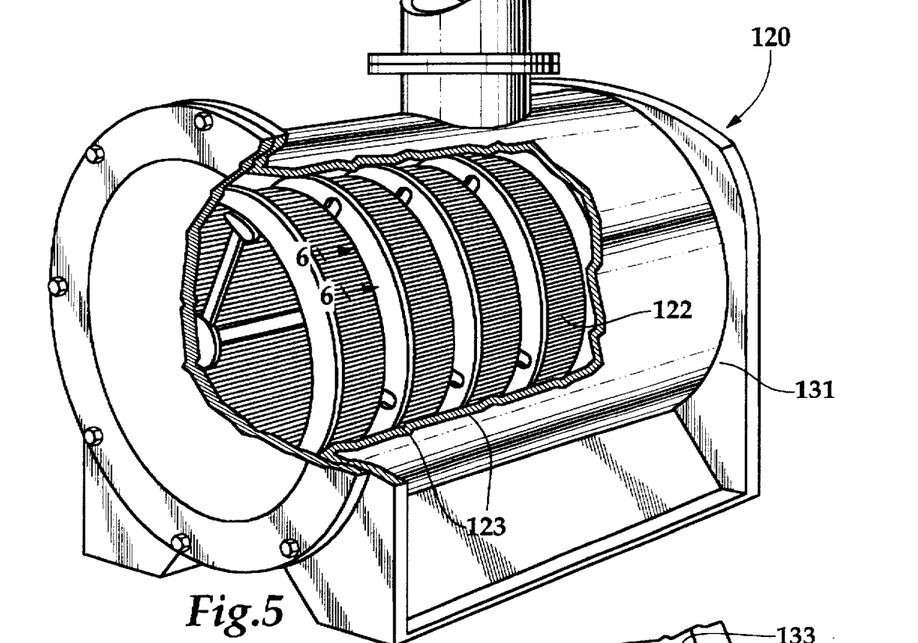
FIG. 5 is an isometric view, partially broken away, of an alternative embodiment pulp pressure screen of this invention having connected cylinder screen segments.
Figure 6:
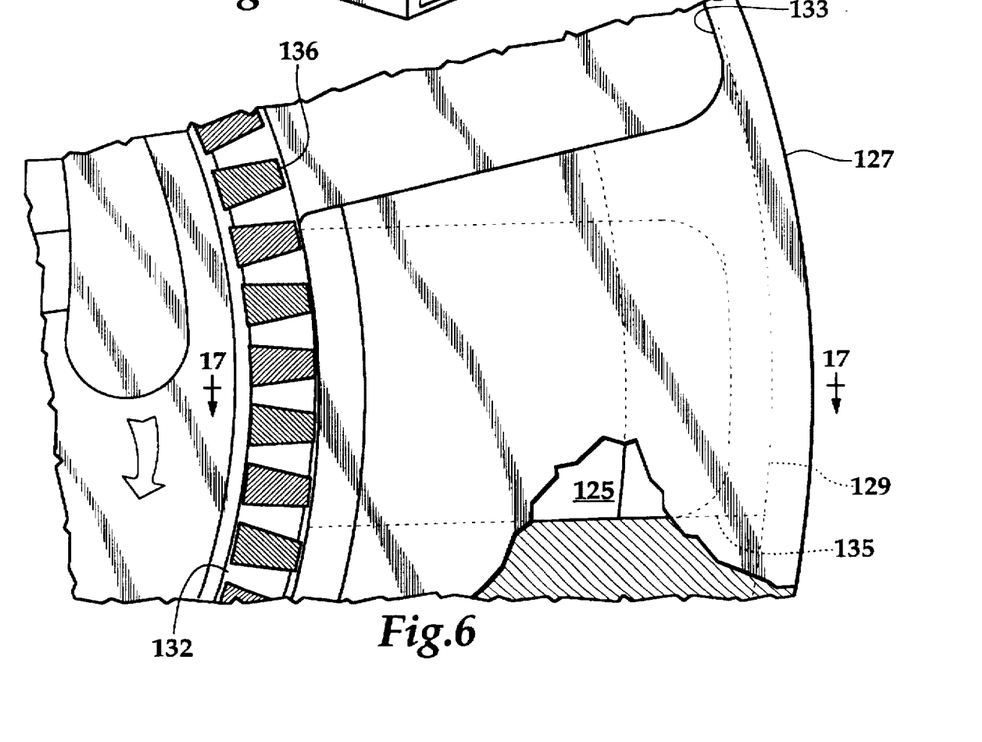
FIG. 6 is a fragmentary cross-sectional view of the pulp screen cylinder of FIG. 5 taken along section line 6—6 and showing one of the plurality of tab and slot engagements between adjacent screen cylinder segments.
Figure 7:
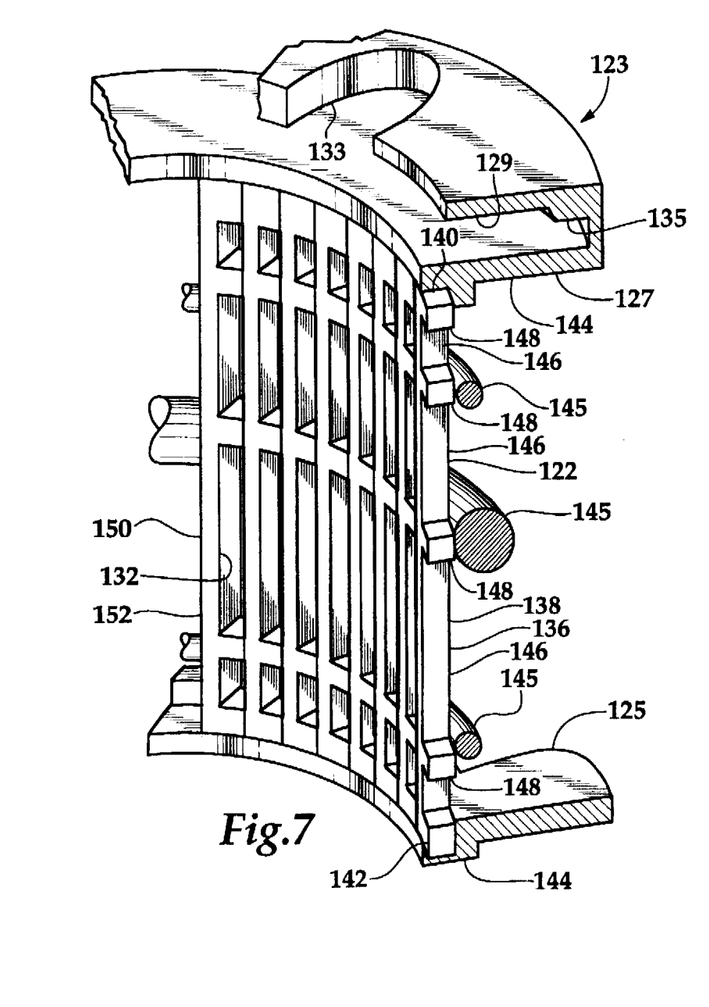
FIG. 7 is a fragmentary isometric view of a screen cylinder segment of the pulp screen of FIG. 5, with the width of the screen openings enlarged for illustrative purposes.

An alternative embodiment pulp pressure screening apparatus 120 is shown in FIGS. 5–7. The pulp screening apparatus 120 is similar to the apparatus 20 shown in FIG. 1, however the screen cylinder 124 eliminates the tie rods shown in FIG. 2. The screen cylinder 124 is comprised of a stacked array of cylindrical cylinder segments 123 which are connected together in a mechanical fit. Each cylinder segment 123, as shown in FIG. 7, has four rigid ears 125 which protrude radially outwardly, and, spaced axially from the ears, a flange 127 having portions defining four recessed locking slots 129. Those segments 123 at the ends of the screen cylinder 124 omit either the ears or the locking slots where the screen cylinder abuts the housing 131. Alternatively, the housing 131 may have corresponding locking slots and ears to engage with such structure on the cylinder 124.

Figure 17:
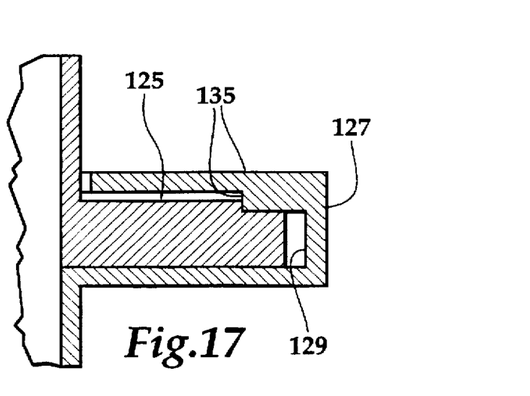
FIG. 17 is a cross-sectional view of the joint between screen cylinder segments of the screen cylinder of FIG. 6 taken along section line 17—17.

As shown in FIG. 6, the flanges 127 have openings 133 which are shaped to receive the ears 125. Hence a complete screen cylinder 124 is assembled by positioning the ears 125 of one segment 123 to pass through the openings 133 on an adjacent cylinder segment. The two segments are then rotated with respect to one another to drive the ears 125 into the locking slots 129, as shown in FIG. 17. A stop 135 within the locking slot 129 positions the two connected cylinder segments 123. Additional segments 123 are connected until a screen cylinder 124 of a desired length is assembled. Then the first segment 123 and the final segment 123 are bolted to the housing 131, and the segments are thus prevented from rotating out of engagement with one another. If desired, the ears and the locking slots may be provided with mating inclined surfaces to permit the connected segments to be engaged with a friction fit. The cylinder 124 may thus be rapidly removed from the housing, and a single segment removed and replaced in a short period of time.

As shown in FIG. 7, each cylinder segment 123 is comprised of an arrangement of identical wedge bars 136 which are positioned in cylindrical array and held in place by being fastened to top and bottom support rings 144 as well as one or more intermediate toroidal support members 145. A means for securing the bars to the rings is provided by furnace brazing or electron beam welding the elements. Each wedge bar 136 has an elongated body 138 with an upper end 140 and a lower end 142. Multiple grooves 146 are cut into each bar 136 by milling or grinding, to thereby leave raised lands 148 at the ends 140, 142. Additional lands 148 are positioned intermediate the ends 140, 142 for attachment of the intermediate support members 145. Each bar 136 tapers radially inwardly, such that when sufficient bars are placed next to one another they define a cylindrical wall 150 of the screen cylinder segment 123. Each wedge bar 136 has an interior face 152 which faces radially inwardly. The grooves 146 relieve a portion of the interior face 152 to define screen openings 130 with an adjacent wedge bar 136.

The lands 148 allow the wedge bars to be stacked together without changing or varying the desired slot size. Uniform positioning of the wedge bars 136 can be enhanced through the use of inclined surfaces at the ends 140 and 140 similar to the inclined surfaces 70 and 72 of the wedge bars 36, with mating surfaces at the support ring 144 similar to the mating surfaces 68 of the support ring 44 as described previously.

The assembled wedge bars 136 are held together and electron beam welded or furnace brazed to the support rings 144 and the support members 145. The support members may be made from any shape stock, but are preferably round stock which is rolled to the required diameter and positioned over the cylindrical wall 150 of wedge bars 136 and located over a sequence of lands 148 and attached thereto by electron beam welding or furnace brazing. By using a rolled round bar as a supporting member, and by locating these supporting members over the lands, the cylinder can withstand the forces developed inside the screening apparatus. Also, by using rolled round bars as supporting members, the open area is maximized and there is also provided an avenue for the electron beam welding or furnace brazing media. These means of attachment also can be effected with minimal distortion.

Electron beam welding uses a beam of electrons to melt and fuse metal which is to be joined together. Electrons, like all charged particles, give up energy as they penetrate a solid material in a way which is dependent on the energy or velocity of the electron. An electron beam welder does not depend on the conducting of heat from the surface of a material to melt the material in depth. Rather the electrons deposit energy deep within the material. The result is a deeper penetrating weld with a relatively small amount of applied energy, which means the heat distortion produced by electron beam welding is minimal. The use of electron beam welding allows joining of the ring-like support members to the wedge bars with little of the heat distortion produced by conventional welding.

Furnace brazing avoids heat distortion because all parts of an assembly are raised gradually to the same temperature, thus avoiding the distortion caused by extreme temperature gradients which can be produced by conventional welding. In furnace brazing a brazing alloy is positioned next to the surfaces which are to be joined. When the assembly of wedge bars, end flanges and support rings reaches the temperature at which the brazing alloy melts, capillary action draws the molten brazing alloy into the capillary spaces defined between adjacent wedge bars and between the bars and the end flanges and the support rings. The brazing process is controlled so the screening holes formed by relieved portions of the wires are not filled by the brazing alloy. After the brazing process is complete the screen cylinder segment is one integral unit where all mating surfaces are joined. This produces a strong stiff structure which resists cyclical loading. This structure also eliminates the potential cylinder failure resulting from failure of the three wedge jack assembly shown in FIGS. 2 and 3.

It should be noted that the grooves 146 in a preferred embodiment will become wider as they extend radially outwardly, as shown in FIG. 6. This widening of the grooves will resist clogging of the screen openings 132.

Examples of alternative embodiment wedge bars for a screen cylinder of this invention are shown in FIGS. 8–15.

Figure 8:
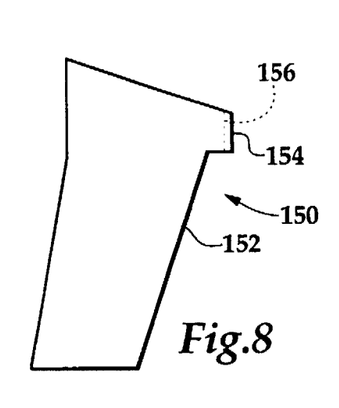
FIGS. 8–11 are cross-sectional views of alternative embodiment wedge bars for use in the pulp screen cylinder of this invention.

A wedge bar 150, shown in FIG. 8, has a bar body 152 and lands 154 on either side of a groove 156. The body 152 opens outwardly to provide relief exterior to the groove 156.

Figure 9:
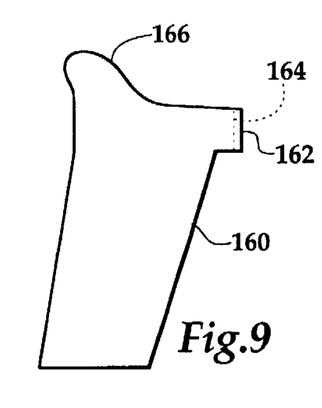

A wedge bar 158, shown in FIG. 9, has a bar body 160 and lands 162 on either side of a groove 164. The body 160 has a curved inner face 166 to direct fluid flows.

Figure 10:
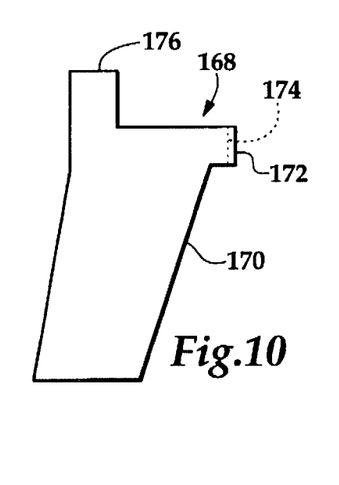

A wedge bar 168, shown in FIG. 10, has a bar body 170 and lands 172 on either side of a groove 174. The body 170 has a member 176 which extends radially inwardly.

Figure 11:
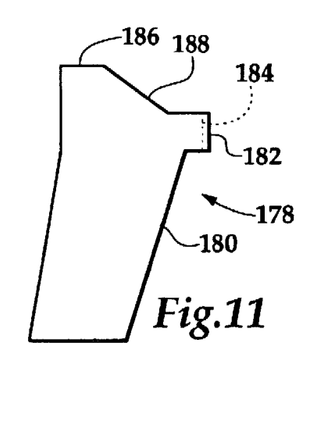

A wedge bar 178, shown in FIG. 11, has a bar body 180 and lands 182 on either side of a groove 184. The body 180 has a member 186 which extends radially inwardly and which has an inclined surface 188 which leads to the groove 184.

Figures 12, 13, 14, 15:
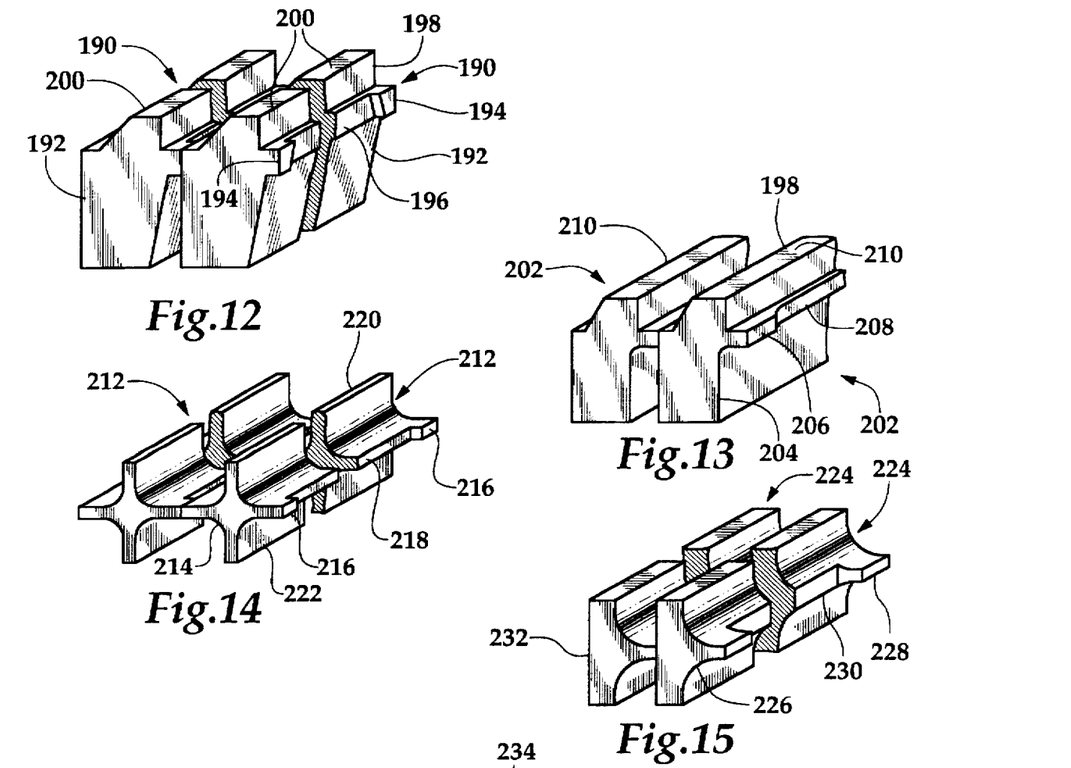
FIGS. 12–15 are fragmentary isometric views of alternative embodiment wedge bars for use in the pulp screen cylinder of this invention.

A wedge bar 190, shown in FIG. 12, has a bar body 192 and lands 194 on either side of a groove 196. The body 192 has a member 198 which extends radially inwardly and which has two inclined surfaces 200 which lead to the groove 184 and to the groove on an adjacent bar 190.

A wedge bar 202, shown in FIG. 13, has a bar body 204 and lands 206 on either side of a groove 208. The body 204 has a member 198 which extends radially inwardly and which has two inclined surfaces 210 which lead to the groove 208 and to the groove on an adjacent bar 202. The body 204 is radiused on the exterior of the groove 208.

A wedge bar 212, shown in FIG. 14, has a bar body 214 and lands 216 on either side of a groove 218. The body 214 has a member 220 which extends radially inwardly and a member 222 which extends radially outwardly.

A wedge bar 224, shown in FIG. 15, has a bar body 226 and lands 228 on either side of a groove 230. The body 226 has a single member 232 which extends both radially inwardly and radially outwardly.

Figure 16:
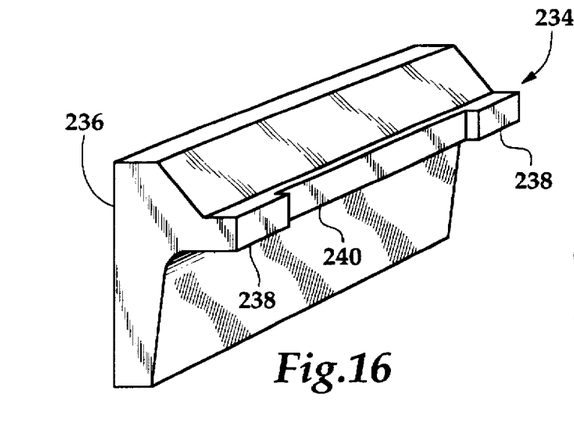
FIG. 16 is an isometric view of another alternative embodiment wedge bar for a screen cylinder of this invention.

A wedge bar 234, shown in FIG. 16, has a bar body 236 and lands 238 on either side of a groove 240. As an example of typical measurements of the wedge bars of this invention, the wedge bar 234 is approximately 3.75 inches tall from one end to the other, and the lands 238 stand out from the floor of the groove 240 by approximately 0.010 inches. The radial depth of the bar is approximately 0.187 inches.

It should be understood that wherein keystone or wedge shaped bars are especially advantageous because they can be compressed and remain stable, the other embodiments shown in FIGS. 8–15 can be formed into cylindrical screen sections by welding to backing rings or to end flanges.

It should also be understood that the screens can be used with rotors of various types. The two lobe wing-shaped rotor shown in FIG. 1 produces a relatively short negative pulse followed by continuous positive pressure produced by system pressure. Other types of rotor include rotors formed of two halves of a cylinder offset by an inch along a plane passing through the axis of the drum. A similar rotor has two opposed lobes or bars mounted to the surface of a cylindrical rotor. Yet another type of rotor has the shape of a Wankel rotor. Some of the foregoing rotors produce a saw-toothed shaped pressure wave with approximately as much time with negative pressure applied to the screen as positive pressure. Screens utilizing aggressive rotors are subject to high stresses and the screens disclosed herein are particularly able to withstand such a high stress environment.

It should be noted that where the grooves ground in the wedge bars have been disclosed as having consistent depths from a radially inward position to a radially outward position, the grooves may be ground to increase in depth as the bar extends radially outwardly to assist in preventing plugging. Furthermore, screens employing welded wedge bars configured as disclosed herein could be used as replacement screens in existing screen cylinders. In addition to being extruded, the wedge bars may be cast, coined or milled.

It is understood that the invention is not limited to the particular construction and arrangement of parts herein illustrated and described, but embraces such modified forms thereof as come within the scope of the following claims.

We claim:

1. A screen cylinder for processing fibers used in papermaking comprising:
   a plurality of wedge bars adjacently positioned to define a cylindrical wall, wherein each bar has an inner face which is positioned on the interior of the cylinder and an outer face which is positioned on the exterior of the cylinder, the inner face and the outer face being joined by two side faces which converge from the outer face toward the inner face, and wherein each wedge bar has portions of at least one of said two side faces which define a radially extending groove between two raised lands, the lands of one bar engaging against a side face of an adjacent bar such that the groove defines a radially extending passage for the flow of pulp stock containing fiber particles from the interior of the cylinder to the exterior of the cylinder;
   at least one annular support ring, having a circumferential groove which receives the plurality of wedge bars; and
   a pair of wedge shaped shims positioned between two wedge bars, the shims being engaged with the wedge bars such that radial movement of one of the pair of shims causes the circumferential width of the pair of shims to increase thereby compressing the wedge bars, to thereby more tightly pack the wedge bars against one another to thereby hold the wedge bars in cylindrical array.

2. The apparatus of claim 1 wherein the radially extending passages increase in width as they extend radially outwardly.

3. The apparatus of claim 1 further comprising portions of at least one wedge bar which define a relief groove which opens on the exterior of the cylinder and does not open on the interior of the cylinder; the relief groove being positioned adjacent a passage to allow the flow of fluid therethrough.

4. The apparatus of claim 1 further comprising:
   a second support ring spaced from said at least one annular support ring, wherein the wedge bars are engaged therebetween; and
   a plurality of tie rods extending through said support rings and applying compressive forces to the wedge bars through the support rings.

5. The apparatus of claim 1 further comprising:
   a screw engaged in a threaded hole of one of said pair of shims; and
   a washer held between the screw and the one of the pair of shims, the washer bridging at least two adjacent structures so that when the screw is turned the engaged shim is caused to move radially.

6. The apparatus of claim 5 wherein the engaged shim is positioned between two wedge shaped shims.

7. A screen for processing fibers used in papermaking comprising:
   a multiplicity of adjacently positioned wedge shaped bars which are arrayed to form a cylinder which defines an interior and an exterior, wherein each bar has an inner face which is positioned on the interior of the cylinder and an outer face which is positioned on the exterior of the cylinder, the inner face and the outer face being joined by a first side and a second side spaced from the first side, the first side diverging radially outwardly from the second, side; and
   portions of a plurality of bars which define a radially extending groove in the bar first side and projecting lands above and below the groove, wherein the bars are positioned in the cylinder such that the projecting lands on the first sides of the bars abut against the second sides of adjacent bars; and
   a plurality of support rings fastened to the exterior of the cylinder, such that the support rings engage the bars adjacent the projecting lands, wherein the projecting lands of each bar are joined to the second side of an adjacent bar and to the support rings to form a screen cylinder segment which is one integral unit.

8. The screen of claim 7 wherein the support rings are electron beam welded to the bars.

9. The screen of claim 7 wherein the support rings are brazed to the bars.

10. A segment of a cylindrical screen for screening papermaking fibers comprising:
    a cylindrical section of screen having a portions defining a plurality of screen openings for the passage of particles from the interior of the cylindrical section to the exterior of the cylindrical section, the section having an upper peripheral edge and a lower peripheral edge;
    an upper flange mounted to the upper peripheral edge, the upper flange having at least three radially extending ears;
    a lower flange having a like number of recesses as the upper flange has ears, the recesses being at least as large as the ears; and
    portions of the lower flange which define slots sized to receive the upper flange ears, such that a cylindrical screen can be formed by joining together cylindrical sections of screen by placing the ears of one segment into the recesses of another segment.

11. The apparatus of claim 10 further comprising at least one second segment having ears and recesses, the segments being engaged together to comprise a screen cylinder having an inlet end and an outlet end, and wherein at least one of said inlet end and outlet end is fixed to a screen apparatus housing to prevent the separation of connected segments by rotation.

12. A segment of a cylindrical screen for screening papermaking fibers comprising:

an upper support ring with portions defining a first circumferential slot which opens toward a lower support ring and which has a cylindrical lip positioned radially outward of the slot, wherein the lower support ring is spaced axially beneath the upper support ring, and the lower support ring has portions which define a second circumferential slot which opens toward the upper support ring and which has a cylindrical lip positioned radially outward of the second slot;

a plurality of axially extending bars which extend between the upper support ring and the lower support ring and which are, upper portions of each bar extending into the first circumferential slot, and lower portions of each bar extending into the second circumferential slot, the bars being thereby engaged between the upper support ring and the lower support ring to define a cylindrical screening wall, wherein each bar has portions defining at least one groove, and wherein the bars abut one another so that the grooves define a plurality of passages for the flow of fluid through the screening wall;

portions of each bar which define an upper surface which is radially inwardly inclined;

portions of each bar which define a lower surface which is radially inwardly inclined;

portions of the upper support ring which define an inwardly inclined surface within the upper support ring first circumferential slot which engages with the upper surfaces of the bars;

portions of the lower support ring which define an inwardly inclined surface within the lower support ring second circumferential slot which engages with the lower surfaces of the bars;

tie rods connected to the upper support ring and the lower support ring; and nuts mounted to the tie rods so that rotation of the nuts draws the upper support ring toward the lower support ring such that the bars are driven by the engaged inclined upper and lower surfaces radially outwardly into engagement with the slot lips to thereby align the bars within the cylindrical screening wall.

13. A screen cylinder for a pressure screening apparatus for processing fibers used in papermaking comprising:

a plurality of cylindrical screen segments arranged end-to-end in axial alignment each screen segment having an upper peripheral edge and a lower peripheral edge;

each segment comprising a plurality of wedge bars arrayed to form a cylinder, each of said bars having an inner face at the interior of the cylinder, an outer face at the exterior of the cylinder and side surfaces extending between said inner and outer faces, a multiplicity of said bars being shaped with at least one of said side surfaces having laterally projecting lands with at least one recess between lands, said lands being in abutting engagement with a side surface of an adjacent wedge bar in the cylindrical array, to thereby define a screen opening between the adjacent wedge bars;

an upper flange mounted to the upper peripheral edge of each segment, each upper flange having at least three radially extending ears;

a lower flange mounted to the lower peripheral edge of each segment, the lower flange having a like number of recesses as the upper flange has ears, the recesses being at least as large as the ears;

portions of the lower flange which define slots sized to receive the upper flange ears such that a cylindrical screen can be formed by joining together cylindrical sections of screen by placing the ears of one segment into the recesses of another segment; and means for securing said arrayed bars to said upper and lower flanges.

14. The screen cylinder of claim 13 wherein the upper and lower flanges have portions defining inclined surfaces which engage with complementarily inclined surfaces defined by portions of the bars.

15. The screen cylinder of claim 13 wherein the means for securing comprises furnace brazing between the bars and the upper and lower flanges.

16. The screen cylinder of claim 13 wherein the means for securing comprises portions of the bars electron beam welded to the upper and lower flanges.

* * * * *